(No Model.) 2 Sheets—Sheet 1.
G. LEVERICH.
TENSION CAR INDICATOR FOR CABLE RAILWAYS.
No. 431,065. Patented July 1, 1890.
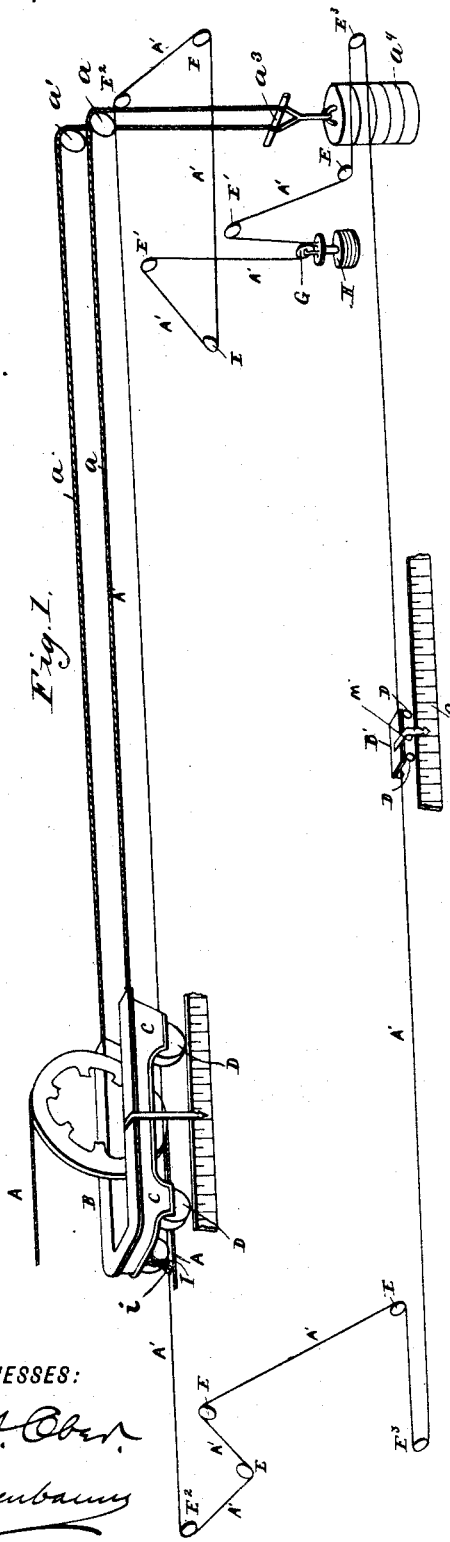
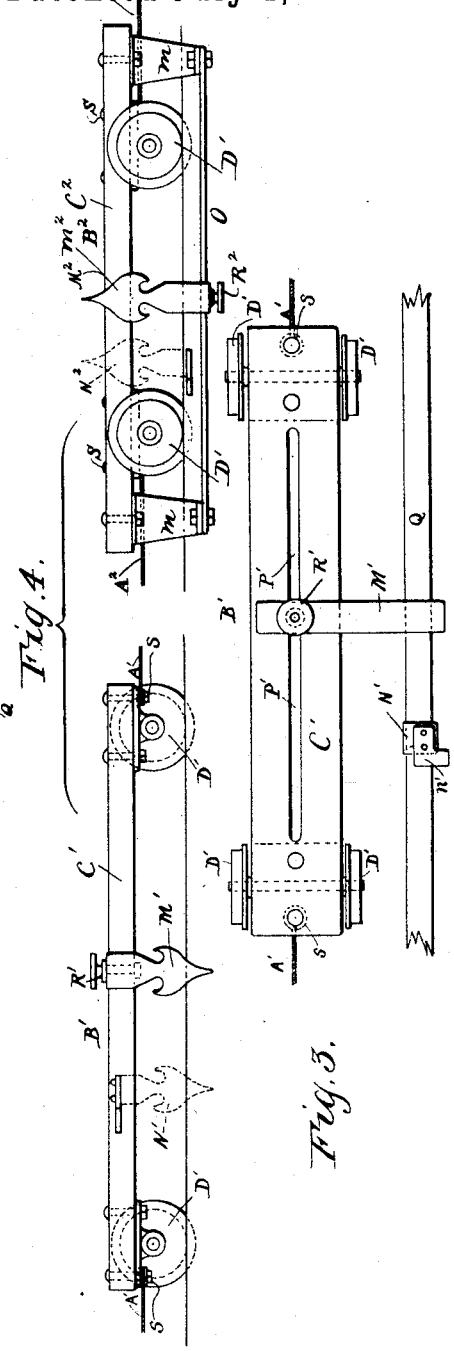
WITNESSES:
INVENTOR
Gabriel Leverich
BY
ATTORNEY.

(No Model.) 2 Sheets—Sheet 2.
G. LEVERICH.
TENSION CAR INDICATOR FOR CABLE RAILWAYS.
No. 431,065. Patented July 1, 1890.
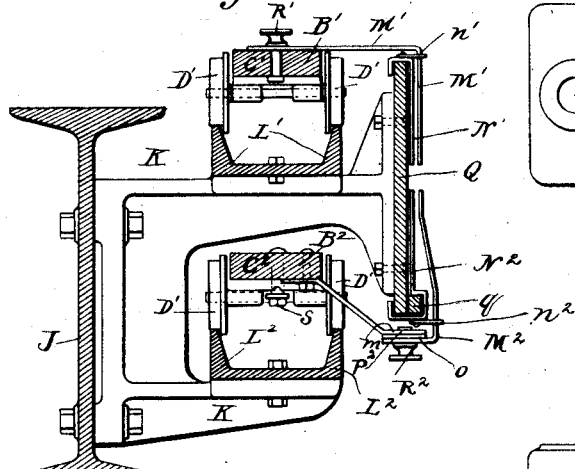
Fig. 2.
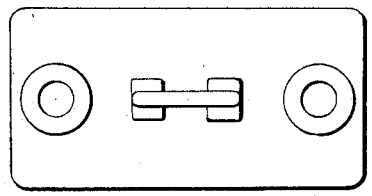
Fig. 5.
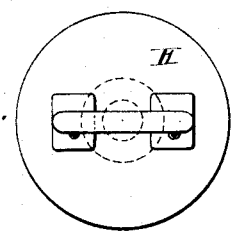
Fig. 9.
Fig. 6.
Fig. 7.
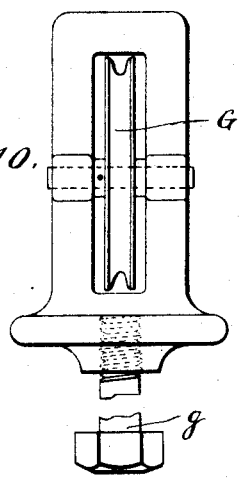
Fig. 10.
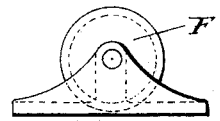
Fig. 8.
WITNESSES:
Frank A. Ober
M. A. Rosenbaum
INVENTOR
Gabriel Leverich
BY
Johnston
ATTORNEY.

UNITED STATES PATENT OFFICE.

GABRIEL LEVERICH, OF SOUTH ORANGE, NEW JERSEY.

TENSION-CAR INDICATOR FOR CABLE RAILWAYS.

SPECIFICATION forming part of Letters Patent No. 431,065, dated July 1, 1890.

Application filed January 18, 1890. Serial No. 337,357. (No model.)

*To all whom it may concern:*

Be it known that I, GABRIEL LEVERICH, a citizen of the United States, residing in South Orange, in the county of Essex and State of New Jersey, have invented certain new and useful Improvements in Tension-Car Indicators for Cable Railways, of which the following is a specification.

On a railway for the transportation of passengers or freight in trains drawn by an endless cable this hauling-cable is usually kept taut as it extends or retracts under the varying loads and the changes of temperature by passing a loop about a sheave on a tension-car, which traverses a track long enough to take up the permanent extension of the cable for a considerable time, and which, by a weight attached over a pulley or other means, resists the retraction and puts a certain stress on the hauling-cable.

To provide a sufficient length of track for the tension-car or for other reasons, it is often convenient to place this track apart from the cable-driving plant, and then it is important that measures be taken whereby the attendant operating the plant and in the room where it is may know at all times the position and movement of the tension-car.

The object of this invention is to provide in the power-room, or at any other place remote from the tension-car and its tracks, an indicator for this purpose.

It consists for each tension-car of a diminutive track in length somewhat greater than the entire traverse of the tension-car, a small indicator-car on this track carrying pointers along the face of a graduated index, a light endless cable connecting the tension and indicator cars, deflecting and bearing pulleys for this cable, a tension-weight to keep it taut, and the necessary supporting-fixtures.

Accompanying and forming a part of this specification are the drawings.

Figure 1 is a diagram showing the general arrangement of a tension-car and indicator. Fig. 2 is a cross-section of the indicator-car track, showing the supports and two indicator-cars in position. Fig. 3 is a plan of the upper indicator-car. Fig. 4 is an elevation of the upper and lower indicator-cars. Figs. 5 and 6 are an elevation and plan of a deflecting pulley and frame, the pulley-wheel being omitted from Fig. 5. Figs. 7 and 8 are an elevation and plan of a bearing pulley and frame; and Figs. 9 and 10 are an elevation and plan of the tension-weights and pulley, the pulley-wheel being omitted from Fig. 9 and the weight-disks being omitted from Fig. 10.

The tension-car B carries a grooved sheave, about which is a loop of the railway-cable A A, and on its flanged wheels D it traverses a track. (Not shown.) The tension-car may be weighted and mounted on a track inclined downwardly and rearwardly from the sheave of the car, whereby the tendency of the tension-car to move down the inclined plane will keep the hauling-cable A taut; but, as illustrated in Fig. 1, the tension-car is preferably arranged to travel in a horizontal plane, and from its rear end a cable or cables $a\ a$ lead over pulleys $a'$ to a vertically-moving bar, from which is suspended a heavy weight $a^4$. An arm I is at one end attached to the tension-car and at the other end has a clamp $i$, which grasps the indicator-cable $A'$. This cable is supported by deflecting-pulleys E E' $E^2$ $E^3$ at points where its direction changes, and by bearing-pulleys F, properly spaced in the lines between the adjoining deflecting-pulleys, leads by convenient changes in direction from the tension-car to its indicator-car B' and back again, making an entire circuit, as shown in Fig. 1. The deflecting-pulleys are so placed that the line of cable inclosed between pulleys $E^2$ and $E^2$ or $E^3$ and $E^3$, near the extremities of the tension-car track or of the indicator-car track, is each, respectively, parallel to its track. At a suitable place between these tracks, as between the deflecting-pulleys E' and E' and on a loop of the indicator-cable, the tension-weight is suspended by a pulley G. This weight keeps the indicator-cable taut and permits it to extend or retract under stress or from temperature. To increase or lessen the weight, as may be best to effect its object, it is made up of circular disks with a hole in the center of each, through which, of as many as may be needed, a tap-bolt $g$ is inserted and screwed into the base of the pulley-frame. By this arrangement the indicator-car will at the same time move precisely the same distance as the tension-car does, but in a contrary direction. Preferably the lines of the loop in the cable between the supporting deflecting-pulleys E' and E' should be vertical.

Two indicator-cars in position—an upper and a lower one—for a pair of tension-cars are shown in Figs. 2 and 4. The arrangement described may be applied to more or to a single tension-car. For ready observation the indicator may be attached to a wall of the power-room. It should be plainly in sight. To this wall, as to the iron beam J, the brackets K are fastened at suitable distances apart. The brackets support on arms one above the other the tracks L' and L² for the two indicator-cars B' B² and on the upper arm the index Q, which extends the length of the tracks. For each track preferably a light wrought-iron rolled channel-bar is used, the small wheels D' of the indicator-cars running on the edges of the flanges, as shown, Fig. 2. The bodies of these cars are of plain rectangular shape, much longer than wide, and are best of cast-iron to give weight sufficient to insure a smooth movement along the tracks.

The two ends of the indicator-cable are clamped to the opposite ends of its cars by looping each around a bolt S and turning up the nut. From the upper car-body C' and attached thereto by the adjustable screw R' through the elongated central slot P' the upper pointer M' extends over the edge of the index, but not in contact with it, and part way down across its face. From the lower car-body C² at each end extends down and outward the arm $m$. The two carry the bar O underneath the index. Attached to this bar by the adjustable screw R² through an elongated central slot in the bar is the lower pointer M², which extends upward part way across the index without touching it.

The index is conspicuously graduated in feet and parts of a foot. Usually there is a similar graduation along the tension-car track to adjust the indicator, so that the two graduations may agree. The indicator-car is brought nearly to a correct position by slacking the clamp $i$ at the tension-car and sliding the cable through it. Then, by loosening the adjusting-screw R' or R², placed, as shown, within easy reach from outside the indicator for the purpose, the pointer M' or M² may be moved along its slot and a precise adjustment made.

Sometimes it is desirable to know what is the greatest extension of a railway-cable in a certain time as measured by the extreme outward movement of the tension-car. For this the index-pointers N' and N² are used. They loosely rest one on the upper edge and the other on the lips $q$ along the lower edge of the index, and are each moved by the pointer M' or M² coming in contact with the projecting stop-piece $n'$ or $n^2$ as the indicator-car runs outward farther than before.

Having thus described my invention, I claim—

1. In cable-railway systems, a tension-car indicator consisting of the combination of a scale, a movable pointer or indicator, the tension-car, and connections between the pointer or indicator and the car, whereby said pointer or indicator is caused to partake of movements relative to the movements of the tension-car, substantially as described.

2. In cable-railway systems, a tension-car indicator consisting of the combination of a tension-car having a sheave for a loop of the hauling-cable and movable on a straight track, an indicator-car movable on a separate parallel track, and connections between the two, whereby they move together, for the purpose described.

3. In cable-railway systems, a tension-car indicator consisting of a tension-car having a sheave for a loop of the hauling-cable and movable on a track built in an isolated location, in combination with an indicator-car movable on a separate track built in a convenient location for observation and mechanical connections between the tension-car and the indicator-car, whereby the latter will partake of the movements of the former.

4. In cable-railway systems, two tracks parallel to each other, the tension-car located and running on one track 9, and having a sheave for a loop of the hauling-cable, and an indicator-car located and running on the other track, in combination with a cord which runs parallel to and throughout the length of both tracks and connected with both cars.

5. In cable-railway systems, two tracks running parallel to each other, the tension-car for the hauling-cable located and running on one track, and an indicator-car located and running on the other track, in combination with a cord which runs parallel to and throughout the length of both tracks and connected with both cars, and deflecting and guide pulleys conducting said cord from one track to the other.

6. In a cable-railway system, a tension-car indicator consisting of a tension-car moving on a track, an indicator-car moving on another track remote from the first, mechanical connections between the two cars, whereby the indicator-car partakes of the movements of the tension-car, a scale extending alongside the track of the indicator-car, and a pointer carried by said car and extending in front of the scale, for the purpose described.

7. The combination, with the tension-car, of an indicator-car partaking of a movement proportional to the movements of the tension-car, a scale parallel to the line of movement of the indicator-car, and a pointer adjustable in a longitudinal direction upon the car and extending in front of the scale.

8. The combination, with the tension and indicator cars, of the cord or cable connecting them together, the deflecting and guide pulleys, and the weight bearing upon the cord, for the purpose described.

9. The combination, with the tension and the indicator cars located remote from each other, of a mechanical connection between the two and a scale adjacent to each, whereby adjustments of the cars with respect to each other may be made.

10. The combination, with the tension and the indicator cars located remote from each other, of a mechanical connection between the two and a pointer connected with each, the one connected with the indicator-car being adjustable, whereby adjustments of the cars with respect to each other may be made.

11. As a means of registering the extreme movements of the indicator-car, the combination, with said car, its pointer, and the scale, of sliding index-clips which are moved by the car when its run outward is farther than its previous run, as set forth.

In witness whereof I have hereunto signed my name in the presence of two subscribing witnesses.

GABRIEL LEVERICH.

Witnesses:
WM. A. ROSENBAUM,
THOMAS K. TRENCHARD.